Patented Sept. 12, 1950

2,521,850

UNITED STATES PATENT OFFICE 2,521,850

HALOGENATED M-DI-TERT-BUTYL-BENZENES

Carl E. Johnson, St. Louis, Mich., and Chester E. Adams, Highland, Ind., assignors to Standard Oil Company, Chicago, Ill., a corporation of Indiana No Drawing. Application May 27, 1947, Serial No. 750,883

1 Claim. (Cl. 260—651)

This invention relates to side chain (exo)-halogenated m-di-tert-butylbenzenes and to a process for their production.

We have discovered that exo-halogenated m-di-tert-butylbenzenes can be prepared readily by the process which will hereinafter be described and that they are surprisingly stable compounds which are of value in preparing various derivatives.

In order to compare the halogenated m-di-tert-butylbenzenes with halogenated p-di-tert-butylbenzenes, we have prepared beta-tetrachloro derivatives from m- and p-di-tert-butylbenzene, respectively. It should be understood, however, that our invention is concerned with exo-halogenated m-di-tert-butylbenzenes, particularly those having 1 to 6 halogen atoms, inclusive, in the molecule. We have found that the m-tetrachloro-di-tert-butylbenzenes can be sulfonated and neutralized with caustic to yield a water-soluble sodium sulfonate derivative having foaming and wetting properties. However, attempted sulfonation of p-tetrachloro-di-tert-butylbenzenes resulted in extensive decomposition, as evidenced by the generation of HCl, and no sulfonic acid or sulfonate could be isolated; other exo-halogenated p-di-tert-butylbenzenes react similarly.

It is an object of our invention to provide side chain (exo) - halogenated m-di-tert-butylbenzenes containing 1 to 6 halogen atoms, inclusive. Another object is to provide new compounds. An additional object is to provide a novel process for the preparation of beta-halogenated m-di-tert-butylbenzenes, particularly beta-chlorinated m-di-tert-butylbenzenes, such as tetrachloro-m-di-tert-butylbenzenes. These and other objects will become apparent from the ensuing description of our invention.

The process which we have employed for the preparation of halogenated m-di-tert-butylbenzenes comprises two principal stages, namely, the preparation of m-di-tert-butylbenzene and its halogenation.

m-Di-tert-butylbenzene preparation

Although the literature reports a number of preparations of di-tert-butylbenzenes, no report has been made of the preparation and isolation of pure m-di-tert-butylbenzene. The alkylation of benzene with isobutylene in the presence of aluminum chloride or other Friedel-Crafts catalysts at normal or moderate temperatures appears to yield almost exclusively the p-di-tert-butylbenzene. We have found, however, that m-di-tert-butylbenzene can be produced in fairly good yield by the dialkylation of benzene with isobutylene in the presence of aluminum chloride at relatively high temperatures, for example temperatures between about 130° F. and about 220° F. The m-di-tert-butylbenzene which is produced by the alkylation reaction can be separated from the isomeric p-di-tert-butylbenzene, which appears to be the only other isomer in the reaction mixture, by fractional distillation.

We have prepared m-di-tert-butylbenzene by passing 230 grams of isobutylene into a rapidly stirred mixture of 225 grams of benzene (previously saturated at room temperature with dry HCl) and 15 g. of anhydrous aluminum chloride over a period of 3 hours, the reaction temperature being maintained between about 130° F. and 140° F. The hydrocarbon products were fractionally distilled under reduced pressure to obtain m-di-tert-butylbenzene, which boils at approximately 78.5° C. (uncorr.) at 4.4 mm. of mercury pressure. The following product distribution was obtained from the fractional distillation operation:

| Compound | Volume percent of Total Product |
|---|---|
| benzene | 4 |
| mono-tert-butylbenzene | 18 |
| m-di-tert-butylbenzene | 16 |
| p-di-tert-butylbenzene | 22 |
| higher boiling products | 39 |

A comparison of some of the physical properties of p- and m-di-tert-butylbenzenes is given in the following table:

| | para- | meta- |
|---|---|---|
| M. P. (°C.) | 76.5–77.5 | 10.6 |
| B. P. at 18.2 mm. (°C.) | 117.3 | 106.5 |
| B. P. at 4.4 mm. (°C.) | 88.6 | 78.5 |
| $n_D^{20}$ | 1 (1.4624) | 1.4870 |

[1] G. Egloff "Physical Constants of Hydrocarbons," vol. III, page 159 (1946).

The molecular weight of m-di-tert-butylbenzene produced by the above process was 197 by the Menzies method; the theoretical value is 190. M-di-tert-butylbenzene absorbed ultraviolet light in a range lower than that of the para isomer.

We may employ other methods than the one described above for the preparation of m-di-tert-butylbenzene. For example, we may effect the isomerization of p-di-tert-butylbenzene to the meta-isomer. p-Di-tert-butylbenzene may be contacted with about 1 to 10 weight per cent of aluminum chloride promoted with a small amount of hydrogen chloride at a temperature sufficiently high to effect isomerization, e. g. temperatures between about 130° F. and about 220° F. or even higher for a period of time sufficient to effect the desired amount of isomerization.

*Chlorination of m-di-tert-butylbenzene*

A solution was prepared of 23 g. of m-di-tert-butylbenzene and 150 cc. (204 g.) of carbon tetrachloride, to which were added 65.6 g. of sulfuryl chloride and 1 g. of benzoyl peroxide. The resulting mixture was refluxed for 18 hours. The reaction product was washed with aqueous sodium hydroxide and dried by filtering through paper. Carbon tetrachloride was then stripped from the essentially water-free solution with nitrogen on a steam bath for 8 hours; a pale yellow viscous oil remained as a residue from the stripping operation. The weight of the residual chlorinated m-di-tert-butylbenzene was 37.9 gs. (96% of the theoretical yield) and its molecular weight as determined by the Menzies method using benzene as the solvent was 320. The molecular weight value obtained compares well with that for a tetrachloro-m-di-tert-butylbenzene, viz. 328. The chlorine content of the chlorinated m-di-tert-butylbenzene was found to be 41.9 per cent as compared with the theoretical chlorine content of 43.3 per cent for tetrachloro-di-tert-butylbenzene.

A sample of the tetrachloro m-di-tert-butylbenzene was refluxed for 6½ hours in an excess of 0.5 N aqueous NaOH. Only 2.75% of the chlorine present in the compound was removed by this treatment. This is good evidence that the butyl groups attached to the benzene ring were tertiary butyl and not isobutyl because it is known that chlorine atoms attached to neopentyl carbon atoms are very resistant to hydrolysis.

It will be evident from the structure of m-di-tert-butylbenzene that there can be several isomeric beta-tetrachloro-m-di-tert-butylbenzenes. The product that we obtained probably contained at least two of the isomers.

p-Di-tert-butylbenzene was chlorinated by the above technique to yield a product melting at 69.4 to 72.2° C. containing 42.8 per cent of chlorine. Tetrachloro-p-di-tert-butylbenzene on treatment with 100% $H_2SO_4$ decomposed to yield HCl and a variety of other products.

Tetrachloro-m-di-tert-butylbenzene did not decompose with 100% $H_2SO_4$; it was sulfonated with fuming $H_2SO_4$ to yield a sulfonic acid. This acid had a neutral equivalent of 455 (theory=410). The high neutral equivalent is probably due to a trace of oil contaminating the product. The sulfonic acid was converted to the sodium salt which was a solid which, when dissolved in water gave foaming properties to the solution.

The difference in the action of sulfuric acid on the isomeric tetrachloro-di-tert-butylbenzenes is rather surprising in view of the fact that the sulfonation of p-di-tert-butylbenzene has been reported in the literature. Thus, Baur dissolved p-di-tert-butylbenzene in warm, concentrated sulfuric acid to produce a sulfonic acid derivative (Ber. 27, 1606 (1894)). A di-tert-butylbenzene, probably the para isomer, has also been reported to be sulfonatable (Heise, Ber. 24, 768 (1891)). One would, therefore, expect the tetrachloro-p-di-tert-butylbenzene to be sulfonatable; however, it is not, whereas the corresponding meta isomer sulfonates readily with strong sulfuric acid.

Although the preparation of chlorinated m-di-tert-butylbenzenes has specifically been described, it should be understood that our invention is not limited to chlorinated compounds or to compounds containing four halogen atoms in the molecule. Thus, it will be apparent that our invention extends to other halogen compounds, such as may be prepared by reacting m-di-tert-butylbenzene with sulfuryl halides other than $SO_2Cl_2$ in the presence of a peroxide catalyst. Although the use of benzoyl peroxide has been specifically described, other catalysts may be used, for example, lauroyl peroxide, dialkyl peroxides and the like. By suitably varying the ratio of sulfuryl chloride or other halogenating agent we may produce exo-halogenated m-di-tert-butylbenzenes containing 1 to 6 halogen atoms, inclusive, in the molecule. It should be understood that although we have described a specific method for introducing a halogen atom into the tert-butyl side chains, we are not limited to this method and may employ any other suitable method, e. g. free halogen in the presence of light or other catalyst which induces side chain halogenation rather than nuclear halogenation.

The halogenated m-di-tert-butylbenzenes, particularly tetra-chloro-m-di-tert-butylbenzene, may be employed as a charging stock for the preparation of a wide variety of chemical derivatives, as for example by nuclear sulfonation, nitration, halogenation, oxidation and the like. The relatively high stability of the carbon-chlorine bonds in the compounds of this invention permits modification of the remainder of the molecule without undesirable chlorine cleavage therefrom.

Having thus described our invention, what we claim is:

A mixture of isomeric beta-tetrachloro-m-di-tert-butylbenzenes, the chlorine atoms of which are resistant to hydrolysis, such that only about 2.75 per cent of chlorine is removed from said mixture upon refluxing thereof with 0.5 N aqueous NaOH for 6.5 hours.

CARL E. JOHNSON.
CHESTER E. ADAMS.

REFERENCES CITED

The following references are of record in the file of this patent:

UNITED STATES PATENTS

| Number | Name | Date |
|---|---|---|
| 2,355,850 | Dreisbach | Aug. 15, 1944 |
| 2,429,691 | Johnson et al. | Oct. 28, 1947 |
| 2,430,822 | Nevison | Nov. 11, 1947 |

FOREIGN PATENTS

| Number | Country | Date |
|---|---|---|
| 448,851 | Great Britain | June 10, 1936 |

OTHER REFERENCES

Calcott et al., "Jour. Am. Chem. Soc.", vol. 61, pages 1010-15 (1939).

Schmerling et al., "Jour. Am. Chem. Soc.", vol. 67, page 1862 (1945).